US011682937B2

(12) United States Patent
Hung et al.

(10) Patent No.: US 11,682,937 B2
(45) Date of Patent: Jun. 20, 2023

(54) ROTOR STRUCTURE WITH MAGNETS AND EDGE NOTCHES WITH ARCS AND CORNERS HAVING SAME RADIUSES

(71) Applicant: TECO Electric & Machinery Co., Ltd., Taipei (TW)

(72) Inventors: Lian-Shin Hung, Taipei (TW); Ching-Chih Huang, Taipei (TW); Yu-De Li, Taipei (TW)

(73) Assignee: TECO ELECTRIC & MACHINERY CO., LTD., Taipei (TW)

( * ) Notice: Subject to any disclaimer, the term of this patent is extended or adjusted under 35 U.S.C. 154(b) by 23 days.

(21) Appl. No.: 17/331,295

(22) Filed: May 26, 2021

(65) Prior Publication Data
US 2022/0337109 A1    Oct. 20, 2022

(30) Foreign Application Priority Data
Apr. 14, 2021  (TW) ................................. 110113347

(51) Int. Cl.
*H02K 1/27*  (2022.01)
*H02K 1/278*  (2022.01)

(52) U.S. Cl.
CPC .................................... *H02K 1/278* (2013.01)

(58) Field of Classification Search
CPC .......... H02K 1/278; H02K 1/27; H02K 1/276; H02K 1/2766; H02K 2213/03
USPC ............. 310/156.53, 156.56, 156.57, 156.55
See application file for complete search history.

(56) References Cited

U.S. PATENT DOCUMENTS

| | | | | | |
|---|---|---|---|---|---|
| 6,034,459 | A | * | 3/2000 | Matsunobu | B60L 15/20 310/156.53 |
| 6,133,662 | A | * | 10/2000 | Matsunobu | H02K 1/278 310/156.53 |
| 6,486,581 | B2 | * | 11/2002 | Miyashita | H02K 21/14 310/156.01 |
| 6,525,442 | B2 | * | 2/2003 | Koharagi | H02K 1/2766 310/156.56 |
| 6,597,079 | B2 | * | 7/2003 | Miyashita | H02K 1/276 310/156.48 |
| 6,867,526 | B2 | * | 3/2005 | Mori | H02K 1/2766 310/156.57 |
| 6,917,133 | B2 | * | 7/2005 | Koharagi | H02K 21/16 310/156.56 |
| 7,119,507 | B2 | * | 10/2006 | Nishijima | H02K 1/276 318/632 |
| 7,151,335 | B2 | * | 12/2006 | Tajima | B60L 50/66 310/156.56 |

(Continued)

*Primary Examiner* — Maged M Almawri
(74) *Attorney, Agent, or Firm* — Muncy, Geissler, Olds & Lowe, P.C.

(57) ABSTRACT

A rotor structure includes a rotor body and a plurality of magnets. The rotor body has a plurality of surrounding magnet-setting areas, and each magnet setting area has a first magnet slot and a second magnet slot symmetrically arranged to a centripetal axis. A first outer end of the first magnet slot and a second outer end of the second magnet slot are close to the centripetal axis and rotor's outer edge. A first outer end of the first magnet slot and a second outer end of the second magnet slot are distant to the centripetal axis and rotor's outer edge. The outer edge has a plurality of notches intersected by the corresponding centripetal axes. The magnets are respectively fixed to the first magnet slots and the second magnet slots of the magnet-setting areas.

3 Claims, 6 Drawing Sheets

(56) References Cited

U.S. PATENT DOCUMENTS

| | | | | |
|---|---|---|---|---|
| 7,230,359 B2* | 6/2007 | Iles-Klumpner | H02K 1/276 | 310/156.56 |
| 7,605,510 B2* | 10/2009 | Okuma | H02K 1/2766 | 310/156.56 |
| 7,612,480 B2* | 11/2009 | Fujii | H02K 1/2766 | 310/156.56 |
| 7,808,143 B2* | 10/2010 | Lee | H02K 1/2766 | 310/156.56 |
| 7,843,101 B2* | 11/2010 | Ito | H02K 1/28 | 417/423.1 |
| 8,179,011 B2* | 5/2012 | Takemoto | H02K 21/16 | 310/156.53 |
| 8,368,273 B2* | 2/2013 | Hino | B60L 50/61 | 310/156.47 |
| 8,405,270 B2* | 3/2013 | Li | H02K 1/276 | 310/156.53 |
| 8,659,200 B2* | 2/2014 | Adaniya | H02K 21/16 | 310/156.57 |
| 9,077,224 B2* | 7/2015 | Morishita | H02K 1/2766 | |
| 9,236,775 B2* | 1/2016 | Takahashi | H02K 21/14 | |
| 9,893,580 B2* | 2/2018 | Soma | H02K 1/276 | |
| 10,003,228 B2* | 6/2018 | Lipo | H02K 1/2766 | |
| 10,958,120 B2* | 3/2021 | Tang | H02K 1/2766 | |
| 2001/0028201 A1* | 10/2001 | Miyashita | H02K 21/16 | 310/254.1 |
| 2002/0047432 A1* | 4/2002 | Miyashita | H02K 21/14 | 310/156.48 |
| 2003/0178905 A1* | 9/2003 | Koharagi | H02K 1/2766 | 310/156.38 |
| 2003/0222526 A1* | 12/2003 | Matsunobu | H02K 29/03 | 310/156.56 |
| 2004/0017123 A1* | 1/2004 | Miyashita | H02K 1/276 | 310/156.53 |
| 2005/0168089 A1* | 8/2005 | Miyashita | H02K 29/03 | 310/156.57 |
| 2005/0200223 A1* | 9/2005 | Tajima | H02K 1/2766 | 310/156.55 |
| 2006/0131976 A1* | 6/2006 | Kikuchi | H02K 1/276 | 310/156.46 |
| 2007/0085436 A1* | 4/2007 | Tajima | B60L 50/66 | 310/156.53 |
| 2007/0126305 A1* | 6/2007 | Okuma | H02K 1/2766 | 310/156.53 |
| 2007/0200447 A1* | 8/2007 | Adaniya | H02K 29/03 | 310/156.53 |
| 2008/0203842 A1* | 8/2008 | Yoshikawa | H02K 1/276 | 310/156.01 |
| 2009/0230802 A1* | 9/2009 | Kamiya | B60L 15/2009 | 903/906 |
| 2010/0181864 A1* | 7/2010 | Miura | H02K 1/2766 | 310/216.094 |
| 2010/0213780 A1* | 8/2010 | Lee | H02K 1/2766 | 310/156.53 |
| 2011/0133590 A1* | 6/2011 | Lokhandwalla | H02K 1/2766 | 310/156.53 |
| 2012/0139378 A1* | 6/2012 | Endo | H02K 15/03 | 29/598 |
| 2012/0139386 A1* | 6/2012 | Murakami | H02K 1/146 | 310/216.092 |
| 2013/0270958 A1* | 10/2013 | Takahashi | H02K 1/274 | 310/156.38 |
| 2014/0217849 A1* | 8/2014 | Soma | H02K 1/2766 | 310/156.53 |
| 2014/0361646 A1* | 12/2014 | Saito | B60L 15/007 | 310/51 |
| 2015/0069874 A1* | 3/2015 | Iki | H02K 1/274 | 310/156.11 |
| 2015/0194849 A1* | 7/2015 | Kayano | H02K 1/276 | 310/156.53 |
| 2015/0372578 A1* | 12/2015 | Matsuda | H02K 1/276 | 310/156.07 |
| 2015/0380996 A1* | 12/2015 | Kim | H02K 1/2773 | 310/156.56 |
| 2016/0365762 A1* | 12/2016 | Liang | H02K 1/2706 | |
| 2017/0085143 A1* | 3/2017 | Tanaka | H02K 29/03 | |
| 2017/0104376 A1* | 4/2017 | Nakagawa | H02K 1/2773 | |
| 2017/0279322 A1* | 9/2017 | Sasaki | G01N 27/82 | |
| 2018/0309333 A1* | 10/2018 | Makino | H02K 1/27 | |
| 2019/0058365 A1* | 2/2019 | Aida | H02K 1/2766 | |
| 2019/0089214 A1* | 3/2019 | Tang | H02K 1/2766 | |
| 2021/0184520 A1* | 6/2021 | Zhang | H02K 1/24 | |

* cited by examiner

FIG.6

ROTOR STRUCTURE WITH MAGNETS AND EDGE NOTCHES WITH ARCS AND CORNERS HAVING SAME RADIUSES

This application claims the benefit of Taiwan Patent Application Serial No. 110113347, filed Apr. 14, 2021, the subject matter of which is incorporated herein by reference.

BACKGROUND OF THE INVENTION

(1) Field of the Invention

The invention relates to a rotor structure, and more particularly to a rotor structure with edge notches.

(2) Description of the Prior Art

Figure 1:
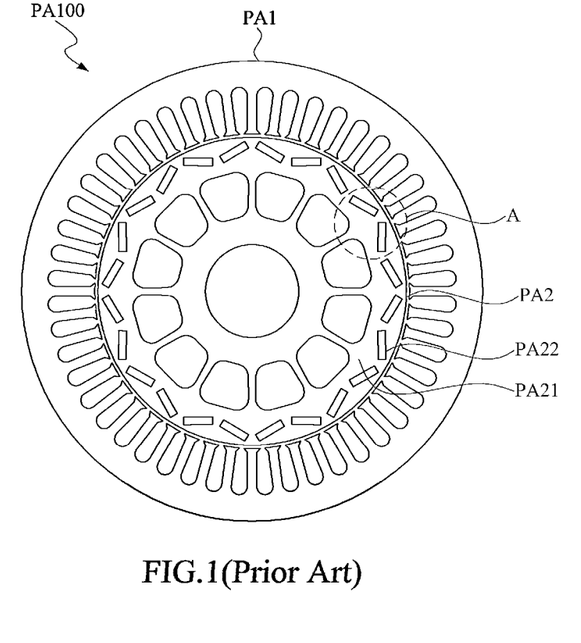
FIG. 1 is a schematic view of a conventional permanent magnet motor structure.
Figure 2:
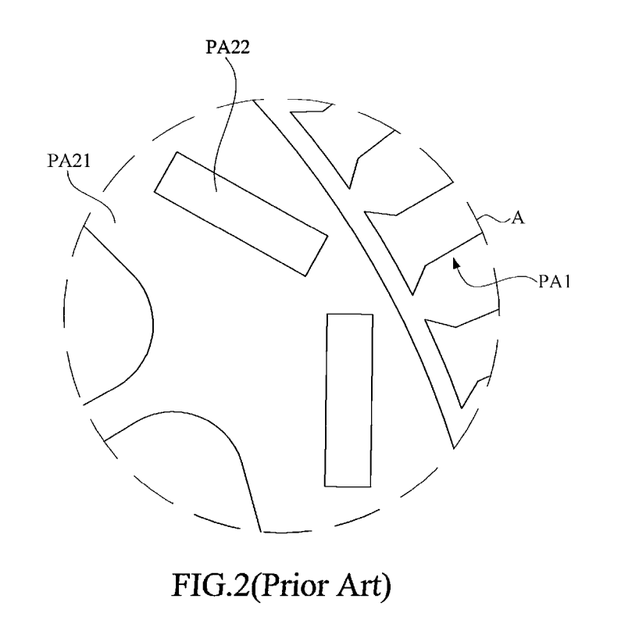
FIG. 2 is an enlarged view of area A of FIG. 1.

Refer to FIG. 1 and FIG. 2; where FIG. 1 is a schematic view of a conventional permanent magnet motor structure, and FIG. 2 is an enlarged view of area A of FIG. 1. As shown, the conventional permanent magnet motor structure PA100 includes a stator structure PA1 and a rotor structure PA2 disposed inside the stator structure PA1. The rotor structure PA2 includes a rotor body PA21 and a plurality of magnets PA22. The plurality of magnets PA22 are individually mounted fixedly in respective magnet-mounting slots (not labeled in the figure) at the rotor body PA21. As shown, the plurality of rectangular magnets PA22 are arranged into V-shape pairs to go along the outer rim of the rotor structure PA2, such that magnetic forcing can be uplifted through properly arranging polarity of the magnets PA22.

Figure 3:
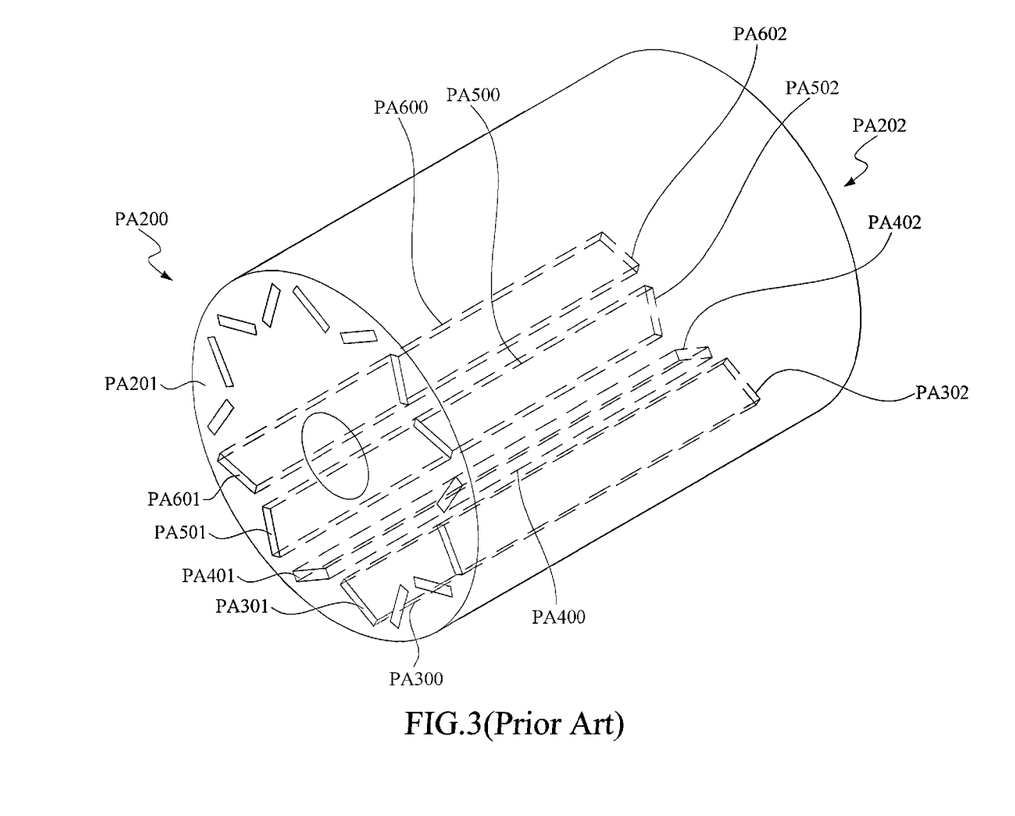
FIG. 3 is a schematic perspective view of a conventional permanent magnet motor.

Referring to FIG. 3, a schematic perspective view of a conventional permanent magnet motor furnished with the magnets PA22 in the aforesaid V-shape arrangement is shown. In FIG. 3, the permanent-magnet motor rotor PA200 has oppositely a first end surface PA201 and a second end surface PA202, and is furnished with a plurality of magnets (only labels PA300, PA400, PA500 and PA600 assigned to the magnets in the figure). As shown, the arrangement of these magnets PA300, PA400, PA500 and PA600 is similar to that shown in FIG. 1. The magnetic polarity of the first end PA301 of the magnets PA300 is the same as that of the first end PA401 of the magnets PA400. Also, the magnetic polarity of the first end PA501 of the magnets PA500 is the same as that of the first end PA601 of the magnets PA600. However, the magnetic polarity of the magnets PA500 and PA600 is reversely arranged to that of the magnets PA300 and PA400.

For example, if the magnetic poles of the first ends PA301 and PA401 are both S poles, then those of the second ends PA302 and PA402 would be both N poles. On the other hand, if the magnetic poles of the first ends PA501 and PA601 are both N poles, then those of the second ends PA502 and PA602 would be both S poles. Obviously, the aforesaid arrangement of the permanent-magnet motor rotor PA200 is to form the magnets PA300 and PA400 into a V-shape pair, and the magnets PA500 and PA600 would be formed to be another V-shape pair. However, these two V-shape pairs would provide reverse magnetic polarity. Namely, in the permanent-magnet motor rotor PA200, the magnetic polarity of the magnet pairs (including PA300, PA400, PA500 and PA600) would be arranged by alternating the N-pole pairs and the S-pole pairs.

As described above, the magnetic forcing of the conventional permanent magnet motor is uplifted through arranging the magnet pairs into alternate V-shape pairs. However, when the permanent magnet motor is operated to an attraction state between the magnetic polarity of the coils at the stator structure and that of the magnets at the rotor structure, the attraction would act against the rotation of the rotor structure, and thus a phenomenon of cogging torque against the the rotation of the rotor structure would be formed.

SUMMARY OF THE INVENTION

In the conventional permanent magnet motor, though the magnetic arrangement of alternating V-shape pairs of the magnets is adopted to increase the magnetic forcing at the rotor structure, yet the cogging torque caused by the attraction between the the coils of the stator structure and the magnets of the rotor structure would appear to act against the rotation of the rotor structure. Accordingly, it is an object of the present invention to provide a rotor structure that can reduce the cogging torque upon the rotating rotor by providing structural improvements.

In the present invention, the rotor structure with edge notches includes a rotor body and a plurality of magnets.

The rotor body has a plurality of magnet-setting areas surrounding a circle center, and each of the plurality of magnet-setting areas is furnished with a first magnet slot and a second magnet slot. The first magnet slot and the second magnet slot are symmetrically and obliquely arranged with respect to a centripetal axis passing through the circle center. A first outer end of the first magnet slot and a second outer end of the second magnet slot are close to the centripetal axis and an outer edge of the rotor body while a first inner end of the first magnet slot and a second inner end of the second magnet slot are distant to the centripetal axis and the outer edge. The outer edge is furnished with a plurality of notches, and each of the plurality of notches is penetrated through by the centripetal axis of the corresponding magnet-setting area.

The plurality of magnets are disposed individually and fixedly in the first magnet slots and the second magnet slots of the plurality of magnet-setting areas.

In one embodiment of the present invention, each of the plurality of notches includes a middle arc portion and two lateral round corners, the centripetal axis passes through the middle arc portion, and the two lateral round corners are disposed to opposite sides of the middle arc portion.

Preferably, the middle arc portion has a 5 mm radius, the two lateral round corners has the same 5 mm radius, and each of the plurality of notches further includes two opposite line segments, where each of the two line segments connects the middle arc portion and one of the two lateral round corners.

In addition, the two line segments are extended to form a notch open angle ranged from 50° to 70°; preferably, 62°.

As stated, the rotor structure of the present invention is to provide a plurality of notches to the outer edge of the rotor structure, and these notches are specifically arranged with respect to centripetal axes of the corresponding magnet-setting areas. Namely, each of the notches is located roughly between the first magnet slot and the corresponding second magnet slot. Thereupon, when the rotor structure is operated, the magnetic fields induced by the magnets at the first magnet slots and the second magnet slots can be further extended to effectively reach the stator, such that the cogging torque upon the rotating rotor structure can be significantly reduced. Further, after the permanent magnet motor is furnished with the rotor structure of the present invention, the operation efficiency can be effectively enhanced.

All these objects are achieved by the rotor structure with edge notches described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a rotor structure with edge notches. In the following description, numerous details are set forth in order to provide a thorough understanding of the present invention. It will be appreciated by a skilled in the art that variations of these specific details are possible while still achieving the results of the present invention. In other instance, well-known components are not described in detail in order not to unnecessarily obscure the present invention.

Figure 4:
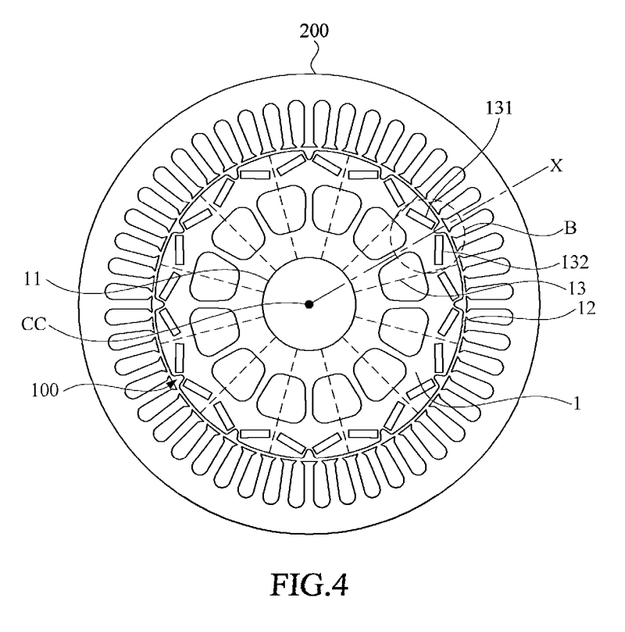
FIG. 4 is a schematic view of a preferred embodiment of the rotor structure with edge notches in accordance with the present invention, disposed inside a stator.
Figure 5:
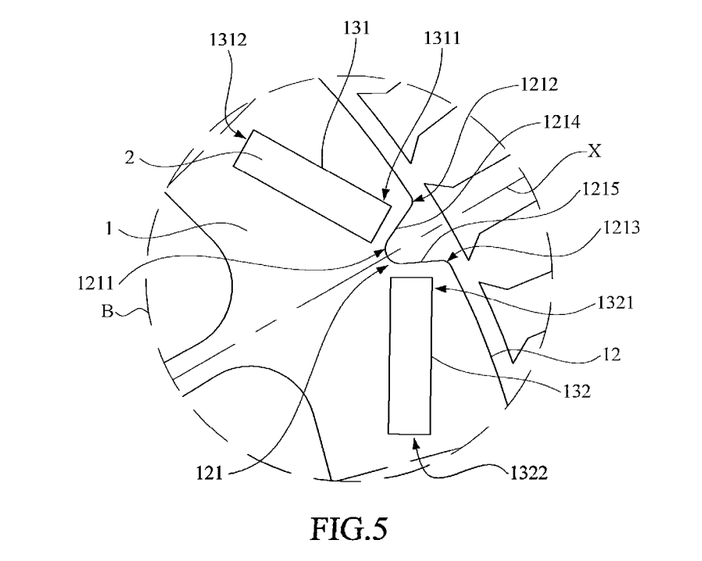
FIG. 5 is an enlarged view of area B of FIG. 4.

Refer to FIG. 4 and FIG. 5; where FIG. 4 is a schematic view of a preferred embodiment of the rotor structure with edge notches in accordance with the present invention, disposed inside a stator, and FIG. 5 is an enlarged view of area B of FIG. 4. As shown, the rotor structure with edge notches 100, disposed inside a stator 200, includes a rotor body 1 and a plurality of magnets 2 (one labeled in the figure). While in a practical operation, the rotor structure 100 is rotated inside the stator 200 with a shaft (not shown in the figure) penetrating through the rotor body 1.

The rotor body 1 has oppositely an inner edge 11 and an outer edge 12, and both the inner edge 11 and the outer edge 12 are circles having the same center CC. That is, the inner edge 11 and the outer edge 12 are two concentric circles. In addition, the rotor body 1 is structured to provide 12 magnet-setting areas 13 (one labeled in the figure) between the inner edge 11 and the outer edge 12. Also, the 12 magnet-setting areas 13 are arranged to surround the circle center CC, and each of the magnet-setting areas 13 is furnished with a first magnet slot 131 and a second magnet slot 132.

As shown in FIG. 5, the first magnet slot 131 and the second magnet slot 132 are obliquely extended and symmetric to each other with respect to a centripetal axis X passing through the circle center CC. The first magnet slot 131 has oppositely a first outer end 1311 and a first inner end 1312. Similarly, the second magnet slot 132 has oppositely a second outer end 1321 and a second inner end 1322. In addition, the first outer end 1311 and the second outer end 1321 are close to the centripetal axis X and the outer edge 12 of the rotor body 1, while the first inner end 1312 and the second inner end 1322 are distant to the centripetal axis X and the outer edge 12 of the rotor structure 1.

In addition, the outer edge 12 is furnished with a notch 121 in each of the magnet-setting areas 13. Thus, in this embodiment, totally, 12 notches 121 are included, and each of the notches 121 has a middle arc portion 1211, two lateral round corners 1212 and 1213, and two line segments 1214 and 1215. The centripetal axis X of the corresponding magnet-setting area 13 is to penetrate through the middle arc portion 1211 of the notch 121, the two lateral round corners 1212 and 1213 are disposed symmetrically to two opposite sides of the centripetal axis X, and the two line segments 1214 and 1215 are respective connections between the middle arc portion 1211 and the corresponding lateral round corners 1212 and 1213.

In this embodiment, the middle arc portion 1211 and the two lateral round corners 1212 and 1213 are to have the same 5 mm radius, and the two line segments 1214 and 1215 are extended to form a notch open angle (not labeled in the figure). In this embodiment, the notch open angle is, but not limited to, 62°. In some other embodiments, the notch open angle may be ranged between 50° and 70°.

The plurality of magnets 2 are individually fixed to the first magnet slots 131 and the second magnet slots 132 of the corresponding magnet-setting areas 13. Polarity arrangement of the magnets 2 can be referred to FIG. 3 and the prior art as described above, and thus details thereabout would be omitted herein.

Figure 6:
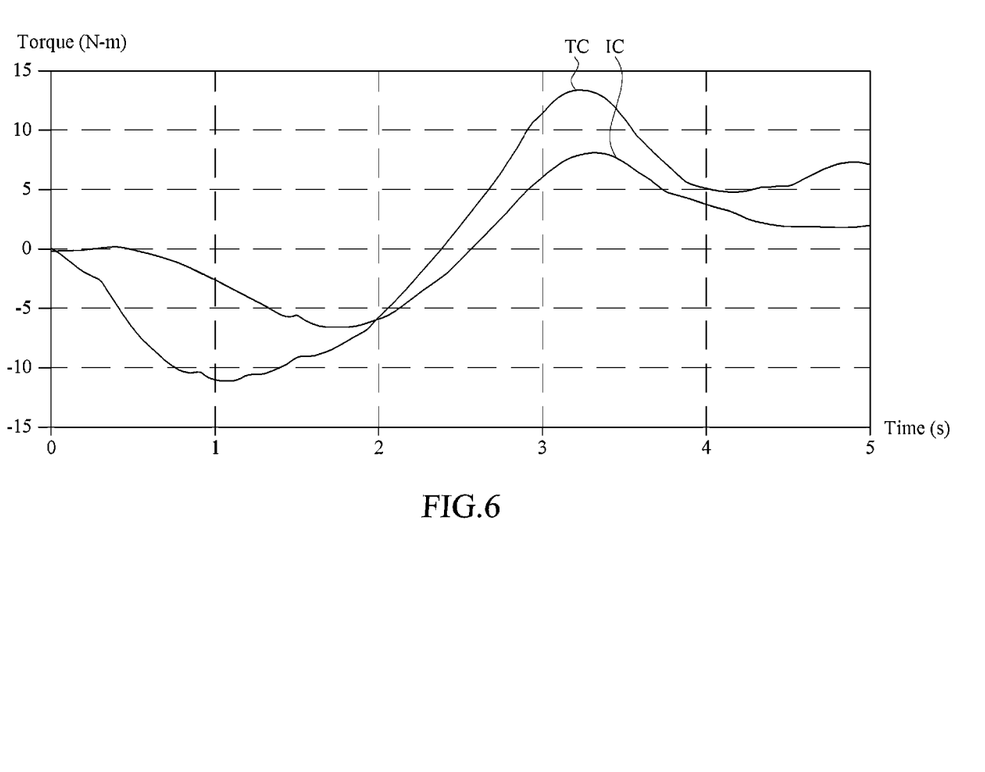
FIG. 6 illustrates variations of operation torques for the permanent magnet motor with the rotor structure of the present invention and that with the conventional rotor structure.

Referring now to FIG. 6, variations of operation torques for the permanent magnet motor with the rotor structure of the present invention and that with the conventional rotor structure schematically illustrated. As shown in FIG. 1, FIG. 2, FIG. 4, FIG. 5 and FIG. 6, variation of torques for the conventional permanent magnet motor structure PA100 is shown by a curve TC, while variation of torques for the permanent magnet motor with the rotor structure 100 with the edge notches 121 is shown by another curve IC.

From curves TC and IC of FIG. 6, it is shown that the permanent magnet motor furnished with the rotor structure 100 with the edge notches 121 provided by the present invention does demonstrate operation torques with a smaller amplitude, in comparison with the conventional permanent magnet motor structure PA100. Thus, it is proved that, with the edge notches 121 of the present invention, the present rotor structure 100 can reduce significantly the cogging torque 100 during operations.

In summary, in comparison to the conventional permanent magnet motor with severe problems in cogging torque, the rotor structure of the present invention is benefited from utilizing a plurality of notches distributed along the outer edge of the rotor structure. When the rotor structure is operated, the magnetic fields of the magnets in the first magnet slots and the second magnet slots would be further expanded effectively to the stator, such that the cogging torque at the rotating rotor structure can be significantly reduced. Thus, with the rotor structure with edge notches of the present invention provided to the permanent magnet motor, the operation efficiency of the motor can be effectively enhanced.

While the present invention has been particularly shown and described with reference to a preferred embodiment, it will be understood by those skilled in the art that various changes in form and detail may be without departing from the spirit and scope of the present invention.

What is claimed is:

1. A rotor structure with magnets and edge notches with arcs and corners having same radiuses, comprising:
   a rotor body, having a plurality of magnet-setting areas surrounding a circle center, each of the plurality of magnet-setting areas being furnished with a first magnet slot and a second magnet slot, the first magnet slot and the second magnet slot being symmetrically and obliquely arranged with respect to a centripetal axis passing through the circle center, a first outer end of the first magnet slot and a second outer end of the second magnet slot being close to the centripetal axis and an outer edge of the rotor body while a first inner end of the first magnet slot and a second inner end of the second magnet slot are distant to the centripetal axis and the outer edge, the outer edge being furnished with a plurality of notches, each of the plurality of notches being penetrated through by the centripetal axis of the corresponding magnet-setting area; and a plurality of magnets, disposed individually and fixedly in the first magnet slots and the second magnet slots of the plurality of magnet-setting areas;

wherein each of the plurality of notches includes a middle arc portion and two lateral round corners, the centripetal axis passes through the middle arc portion, the two lateral round corners are disposed to opposite sides of the middle arc portion, and the middle arc portion and the two lateral round corners are structured to have the same radiuses, wherein each of the plurality of notches further includes two opposite straight line segments, and each of the two straight line segments connects the middle arc portion and one of the two lateral round corners, and wherein the two line segments are extended to form a notch open angle ranged from 50° to 70°.

2. The rotor structure with magnets and edge notches with arcs and corners having same radiuses of claim 1, wherein each of the middle arc portion and the two lateral round corners of each of the plurality of notches has a 5 mm radius.

3. The rotor structure with magnets and edge notches with arcs and corners having same radiuses of claim 1, wherein the notch open angle is 62°.

* * * * *